(12) United States Patent
Duffin (10) Patent No.: US 11,400,483 B2
(45) Date of Patent: Aug. 2, 2022

(54) INCREMENTAL ON DEMAND DISPENSING UNIT

(71) Applicant: Marcus Duffin, Hillsboro, OR (US)

(72) Inventor: Marcus Duffin, Hillsboro, OR (US)

(73) Assignee: NODK, LLC, Wilsonville, OR (US)

( * ) Notice: Subject to any disclaimer, the term of this patent is extended or adjusted under 35 U.S.C. 154(b) by 365 days.

(21) Appl. No.: 16/790,930

(22) Filed: Feb. 14, 2020

(65) Prior Publication Data

US 2021/0252550 A1    Aug. 19, 2021

(51) Int. Cl.
*B05C 17/01* (2006.01)
*B05C 17/005* (2006.01)
*A61C 5/62* (2017.01)

(52) U.S. Cl.
CPC ............ *B05C 17/0116* (2013.01); *A61C 5/62* (2017.02); *B05C 17/00503* (2013.01); *B05C 17/00593* (2013.01)

(58) Field of Classification Search
CPC ........... B05C 17/0116; B05C 17/00503; B05C 17/00593

USPC .......................................................... 433/80
See application file for complete search history.

(56) References Cited

U.S. PATENT DOCUMENTS

| | | | |
|---|---|---|---|
| 5,450,988 A * | 9/1995 | Jerdee ................. | F16H 25/2025 74/424.89 |
| 5,499,547 A * | 3/1996 | Nagai ...................... | B23Q 1/58 74/89.32 |
| 5,782,633 A | 7/1998 | Muhlbauer | |
| 8,905,995 B2 | 12/2014 | Mernoe | |
| 9,308,057 B2 | 4/2016 | Weill et al. | |
| 10,307,785 B2 * | 6/2019 | Cash ................... | B05C 17/0126 |
| 2009/0060624 A1 | 3/2009 | Schenck et al. | |
| 2013/0035647 A1 | 2/2013 | Veasey et al. | |
| 2016/0058949 A1 * | 3/2016 | Bayer ............... | A61M 5/31583 604/207 |

* cited by examiner

*Primary Examiner* — Jeremy Carroll
(74) *Attorney, Agent, or Firm* — Harpman & Harpman (57) ABSTRACT

An applicator for on demand incremental dispensing of dental compounds from interchangeable prefilled cartridges. A hand held applicator support body with a threaded drive rod, selectively advanced by a trigger activated indexing lever assembly for advancing engagement within the medication cartridge. A release and positional indicator allows for drive rod engagement and resetting therewithin.

10 Claims, 8 Drawing Sheets

FIG. 9

INCREMENTAL ON DEMAND DISPENSING UNIT

BACKGROUND OF THE INVENTION

1. Technical Field

This invention relates to applicators for dental compounds that require precise application and positioning compounds during use in oral medical environments.

2. Description of Prior Art

Prior art devices of this type can be seen in U.S. Pat. Nos. 5,782,633, 8,905,995, 9,308,057, and U.S. Publications 2009/0060624 and 2013/0035647.

In U.S. Pat. No. 5,782,633 and applicator for dental compounds is disclosed having an elongated implemented body with a pusher rod engageable plunger of a dispensing syringe. A rack and pinion gear configuration allows for advancement of the rod thereby injecting the material within the syringe.

U.S. Pat. No. 8,905,995 claims a wearable medical dispenser device with a piston rod advancing by a gear engaged motor dispensing a liquid medicine to the patient.

An injection device for small doses is shown in U.S. Pat. No. 9,308,057 having a threaded rod with a threaded advanced fixed indexing drive bolt thereon. The user activated lever rotates the drive bolt advancing the rod for dispensing.

U.S. Pat. No. 9,707,354 discloses a multiple dosage injector with a rack and pinion dosage system activation by a gear interengagement.

In U.S. Publication 2009/0060624 a pen configured dispenser is illustrated having an integral tank for injectable materials. A piston advancing mechanism has a pushing member that rotates a piston injecting the rod and plunger.

In U.S. Publication 2013/0035647 a medical dispensing device is disclosed showing a wearable disposable medical dispensing device with a piston rod that advances to dispense medicine from the device. A rotational motor coupled to a drive mechanism carries out the revolution thereby displacing a piston rod by a desired distance.

SUMMARY OF THE INVENTION

A medical dental material dispenser device to provide an on demand incremental dispensing of cartridge-based compounds. The dispensing device utilizes a threaded drive rod in a rotatable drive engagement housing engaged by indexing engagement gear. A selective engagement and release gate enable drive rod advancement and then release for resetting the device after use. A trigger assembly and rod linkage provides indexed activation to the rotatable drive engagement housing rotating the drive rod in place therein.

DETAILED DESCRIPTION OF THE INVENTION

Figure 1:
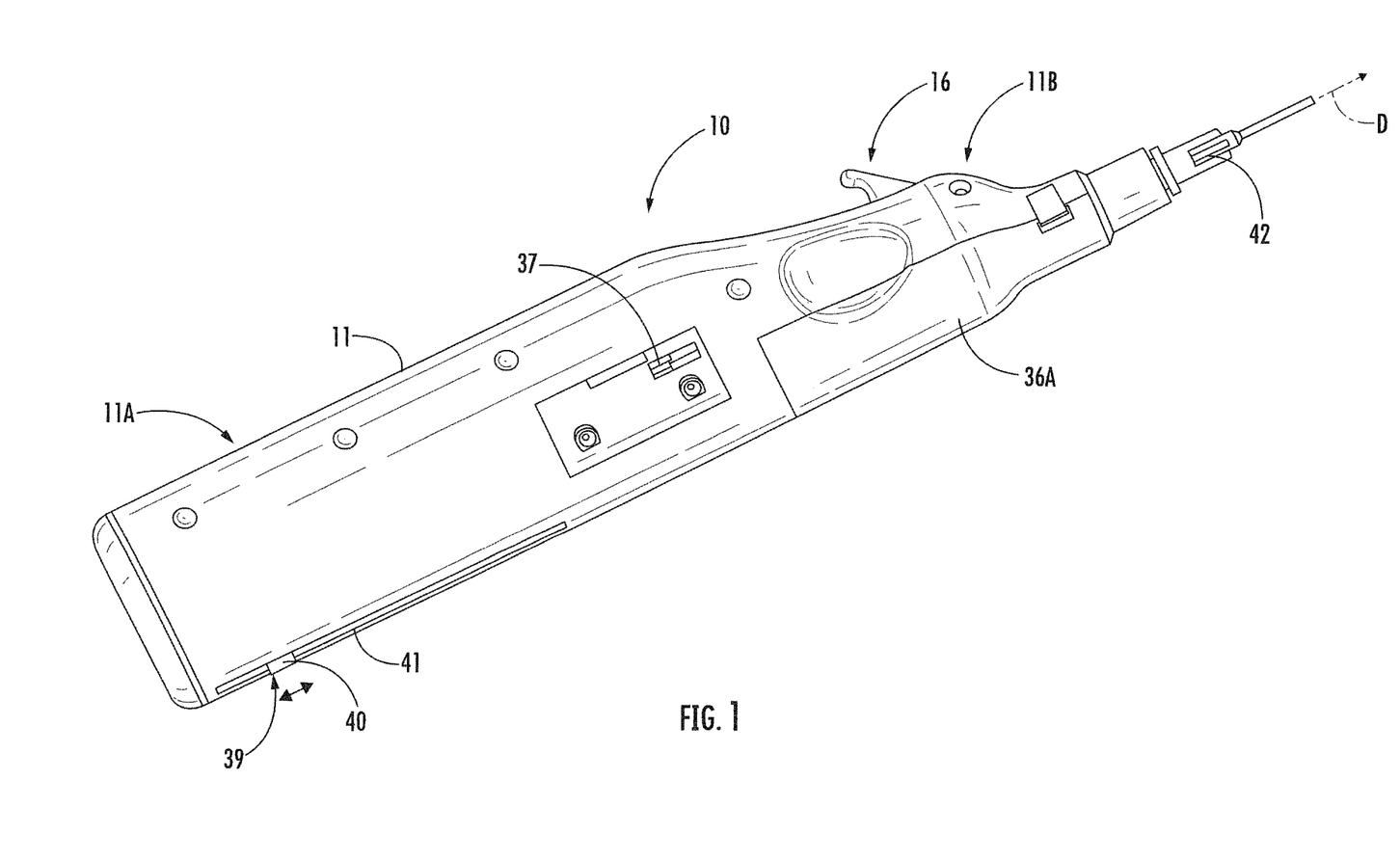
FIG. 1 is a side elevational view of the applicator for dental compounds.
Figure 2:
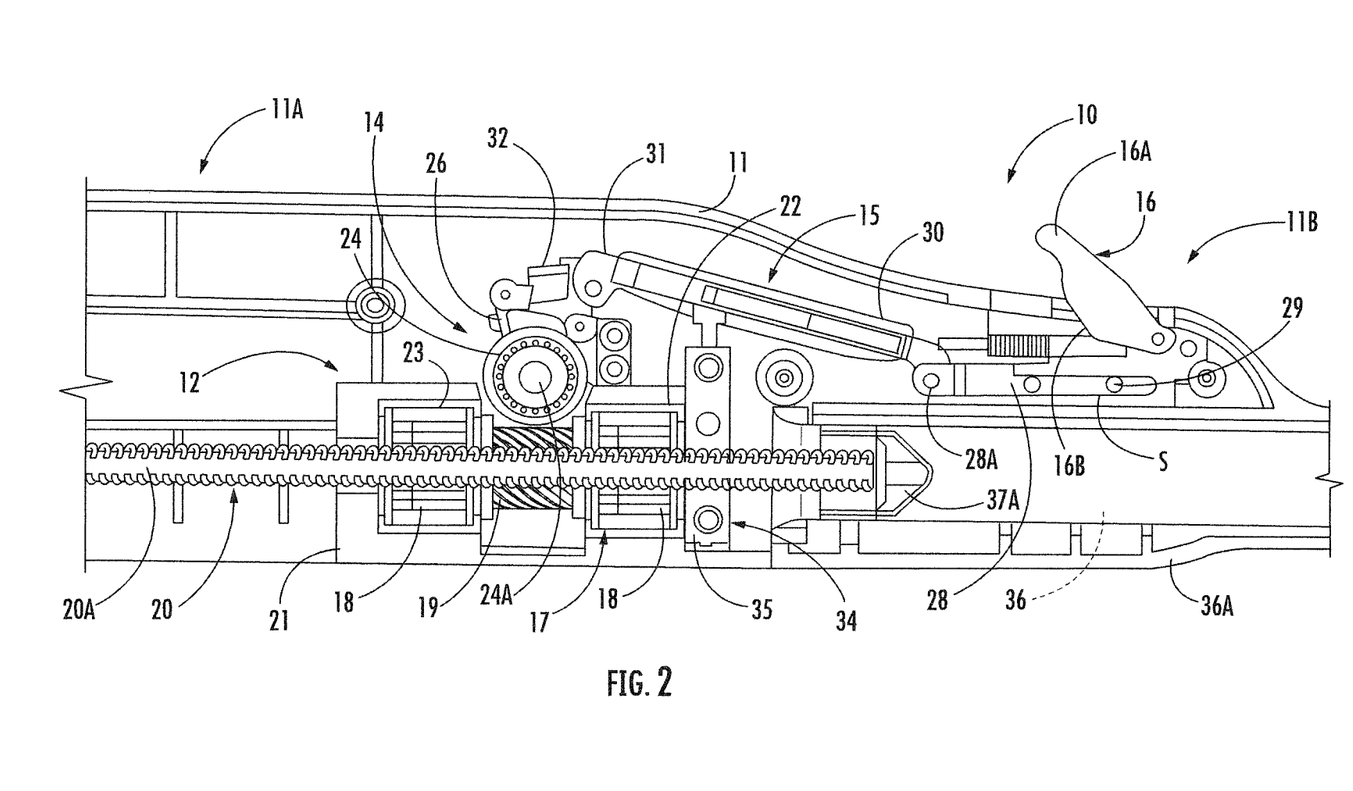
FIG. 2 is an enlarged cross-sectional view thereof with portions broken away for illustration.

An applicator for dental compounds 10 can be seen in FIGS. 1, 2, 3 and 4 of the drawings having a contoured elongated encasement housing 11 with a handle portion 11A and a product access dispensing end portion 11B. The handle portion 11A has a rotatable drive rod assembly 12 there within, as best seen in FIG. 2 of the drawings. The drive rod assembly 12 is in communication with an indexing drive gear assembly 14 and control activation linkage 15 which extends between the indexing drive gear assembly 14 and a trigger 16 that extends from the housing 11 as will be described in greater detail hereinafter.

Figure 3:
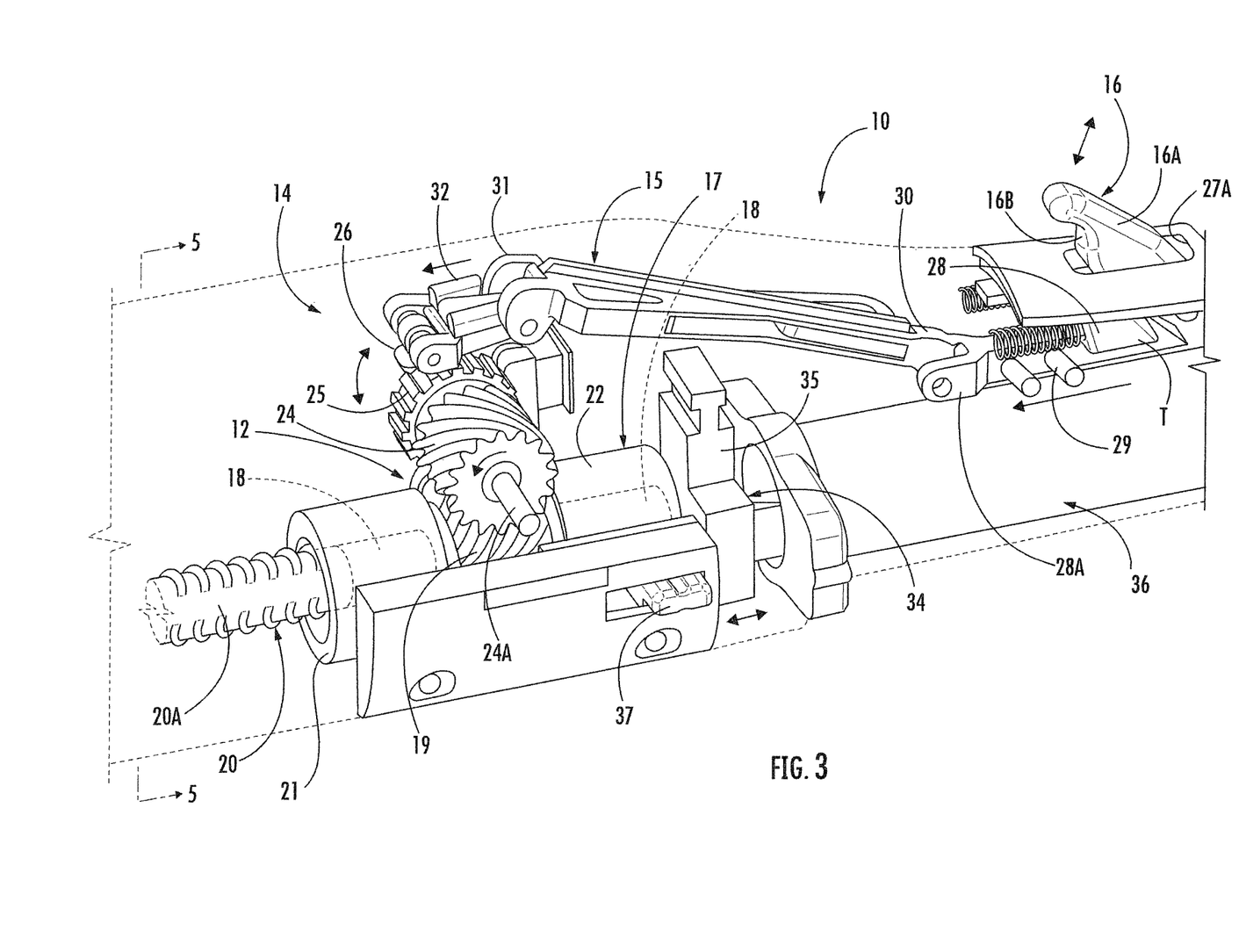
FIG. 3 is an enlarged perspective view of the applicator with portions broken away.
Figure 4:
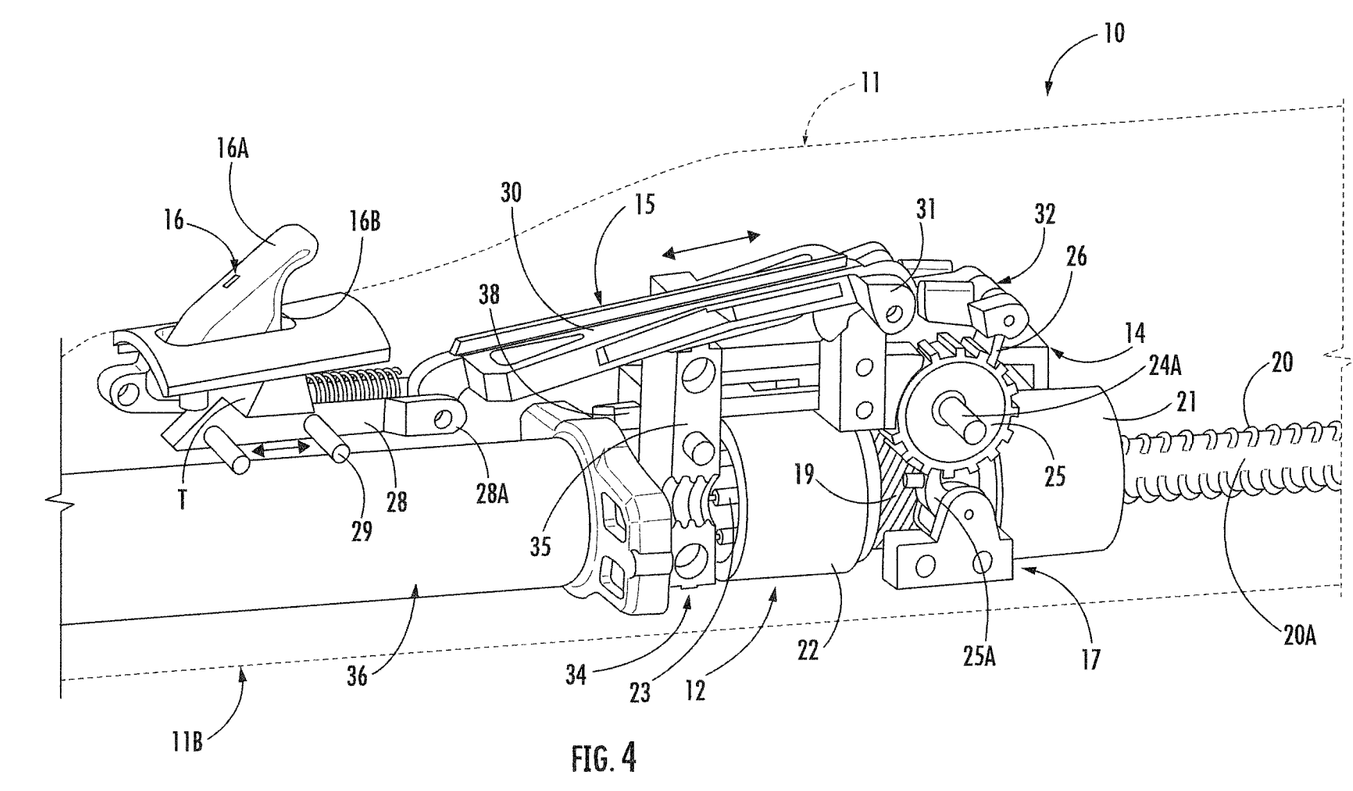
FIG. 4 is an enlarged reverse perspective view of the applicator with portions broken away.
Figure 5:
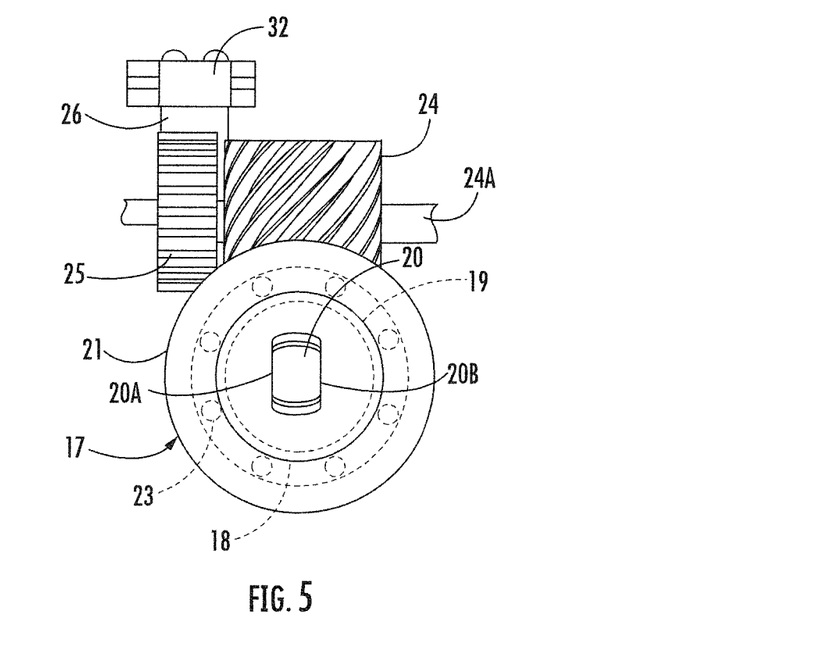
FIG. 5 is an enlarged partial cross-sectional view of indexing and linkage of the applicator on lines 5-5 of FIG. 3.
Figure 6:
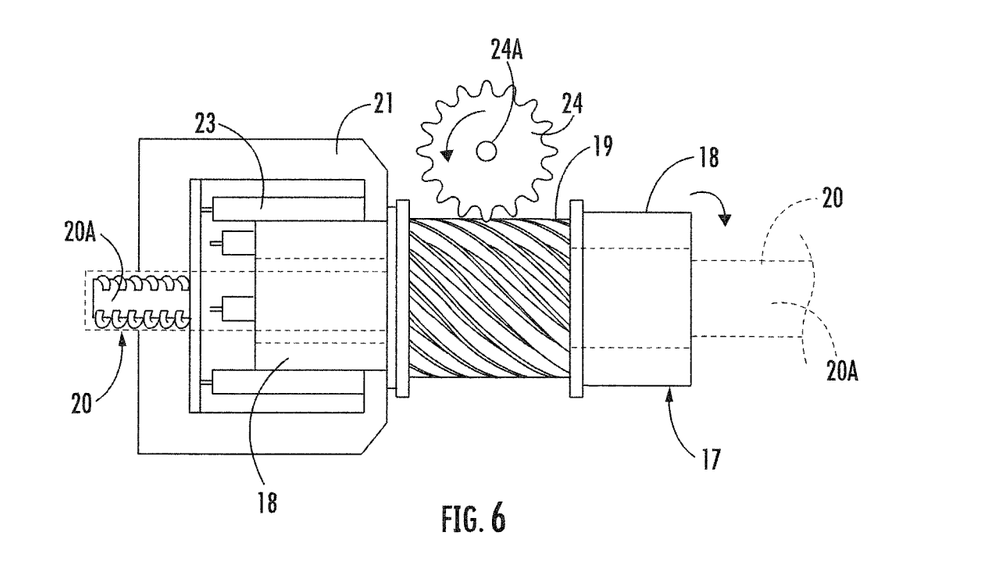
FIG. 6 is an enlarged partial side elevational view of the rotatable rod engagement fitting.

Referring now to FIGS. 2, and 3 of the drawings, the drive rod assembly 12 can be seen having a rotatably rod engagement cylinder 17 having a pair of longitudinally spaced oppositely disposed identical annular apertured rod engagement keys 18 interconnected by a helical drive gear 19 between. The rod engagement keys 18 registerably receive a thread drive rod 20 having non-threaded surfaces 20A and 20B which extends longitudinally therethrough for selective intermittent rod rotation as will be described hereinafter.

The rod engagement cylinder 17 is rotatably positioned within a pair of annular bearing fittings 21 and 22 each having multiple engagement rollers 23 there about allowing for axial rotation of the rod engagement cylinder 17 within the housing 11.

The helical drive gear 19 is in turn registerably engaged for intermittent rotation by a corresponding helical pinion engagement gear 24 fixed on a drive shaft 24A. An indexing gear 25 is fixed on the drive shaft 24A thereby providing for selective rotational input thereto which is imparted by an indexing engagement pawl 26 extending from the terminal end of control activation linkage 15, best seen in FIG. 4 of the drawings. A ratchet pawl 25A engages the indexing gear 25 in oppositely disposed relation thereto impacting directional rotation restriction thereto.

The trigger 16 is pivotally secured within the housing 11 with an upstanding user end engagement portion 16A that extends outwardly from the housing's outer surface through an access opening 27A therein.

The trigger 16 has a cam surface 16B which engages on a tapered end T of a dual spring urged contact lever arm 28 slidably disposed within parallel spaced guide slots S by registering guide pins 29 extending therefrom.

The lever contact arm 28 has an apertured bifurcated end at 28A with a linkage arm 30 pivoted thereto. The linkage arm 30 provides a longitudinally angular offset extension with a pivoted end connection at 31 for a ratchet linkage 32 from which extends the indexing engagement pawl 26.

Referring back to FIGS. 2, 3 and 4 of the drawings, a rod engagement gate 34 can be seen having a threaded gate element 35 for transversely engaging the threaded drive rod 20 before engagement with a product injection cartridge 36 which is removably positioned within the product injection end portion 11B of the housing 11 through a dispenser hatch 36A as best seen in FIGS. 1 and 2 of the drawings.

It will be seen that the threaded gate element 35 is thereby slidably displaced for selective engagement with the drive rod 20 by a button/switch 37 which extends from the side of the encasement housing 11. The button/switch 37 is moved longitudinally having a tapered bar element 38 for wedging registration with the gate element 35 displacing same and holding it in threaded engagement with the now engaged drive rod 20. This allows the drive rod 20 to advance linearly within the housing 11 upon indexing rotation imparted by the rod drive gear assembly 14 as hereinbefore described. The advancing drive rod 20 engages on a piston fitting 37A within the product injector cartridge 36 expelling a specific volume of compound material D through a syringe tip 42 as best seen in FIGS. 1 and 2 of the drawings.

The product injector cartridge 36 is interchangeable so, for example, one product cartridge 36 may contain a dental treatment compound of 38% silver diamine fluoride while a replacement cartridge may contain a 5% of sodium fluoride varnish which are both well known dental treatment applications within the art.

Figure 7:
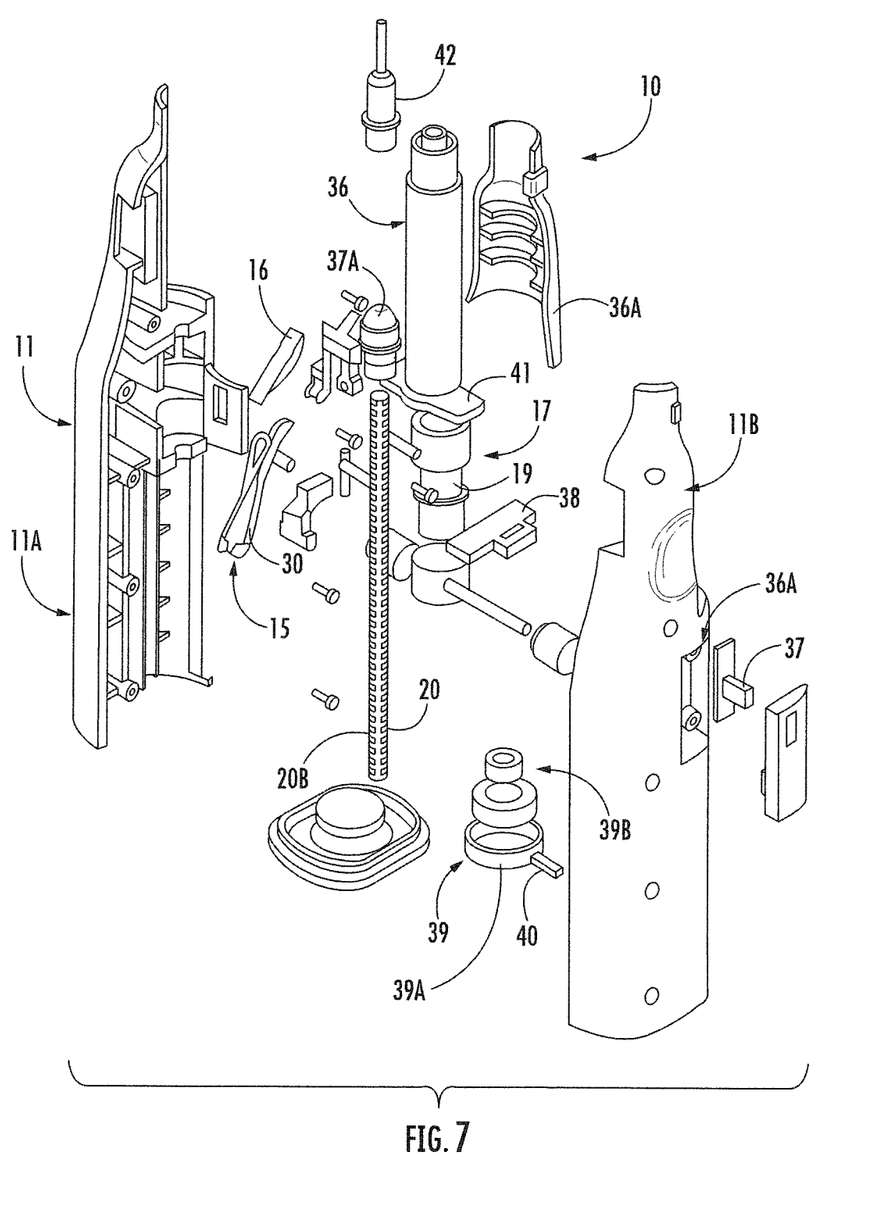
FIG. 7 is an exploded perspective view of the applicator.
Figure 8:
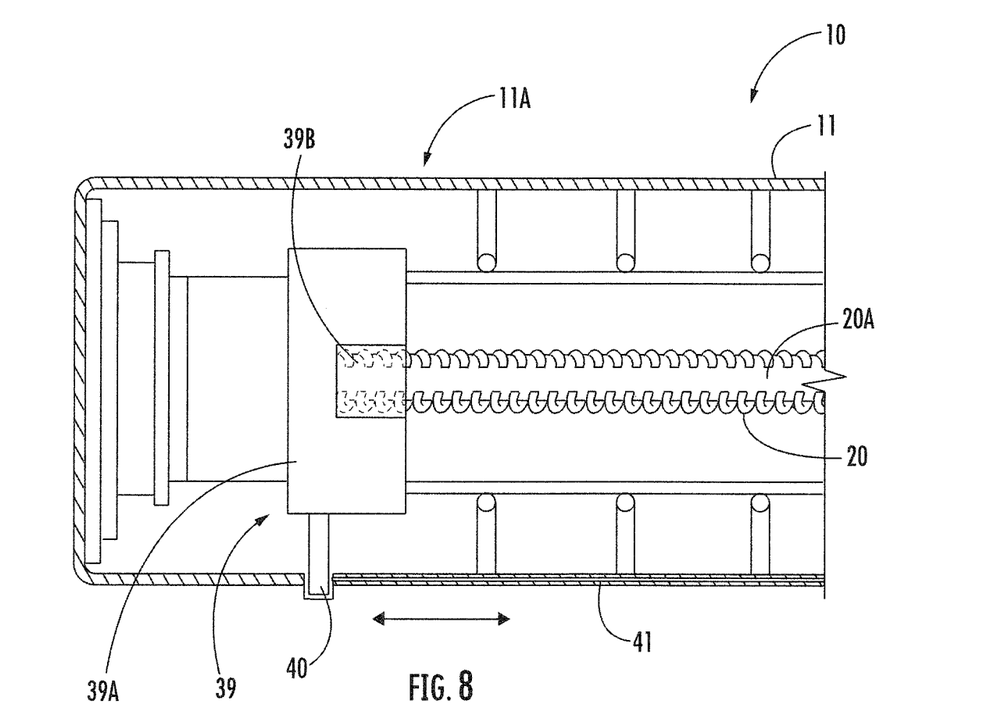
FIG. 8 is an enlarged partial sectional view of the reset and rod fitting.

Referring now to FIGS. 1,7 and 8 of the drawings, a drive rod reset fitting 39 can be seen slidably positioned within the handle portion 11A of the housing 11. The drive rod reset fitting 39 has a support sleeve 39A with a worm bearing 39B that engages the drive rod 20. A user accessible access lever 40 extending therefrom through a travel slot 41 in the housing 11. This orientation will allow the application dispenser 10 to be manually reset after use by the disengagement of the threaded engagement gate element 35 from the drive rod 20 as hereinbefore described and indicates the relative position of the drive rod within the cartridge 36 indicating the material discharged during use.

In use, the dental compound applicator 10 of the invention is loaded with the chosen injector cartridge 36 in the injector end portion 11B of the housing 11 through the access hatch 36A. The contact button/switch 37 is advanced, closing the threaded gate element 35 onto the threaded portion of the drive rod 20 as hereinbefore described. The user, not shown, positions the applicator 10 for use and pushes the trigger 16 which incrementally rotates the helical pinion gear 24 through the hereinbefore described indexing engagement pawl 26 on the indexing drive gear 25 advanced by the control activation linkage 15 interlinked thereto. The rod engagement cylinder 17 is incrementally rotated by registration of the helical drive gear 19 as hereinbefore described.

Upon completion of the dental material application or when a new cartridge is required the user can unlock the drive rod 20 by the contact button/switch 37 sliding the threaded gate element 35 from drive rod engagement thus releasing the drive rod 20 and can then manually retract it from outside the housing by the access lever 40 of the drive rod reset fitting 39 as described. The cartridge 36 can then be removed and/or replaced as required.

Figure 9:
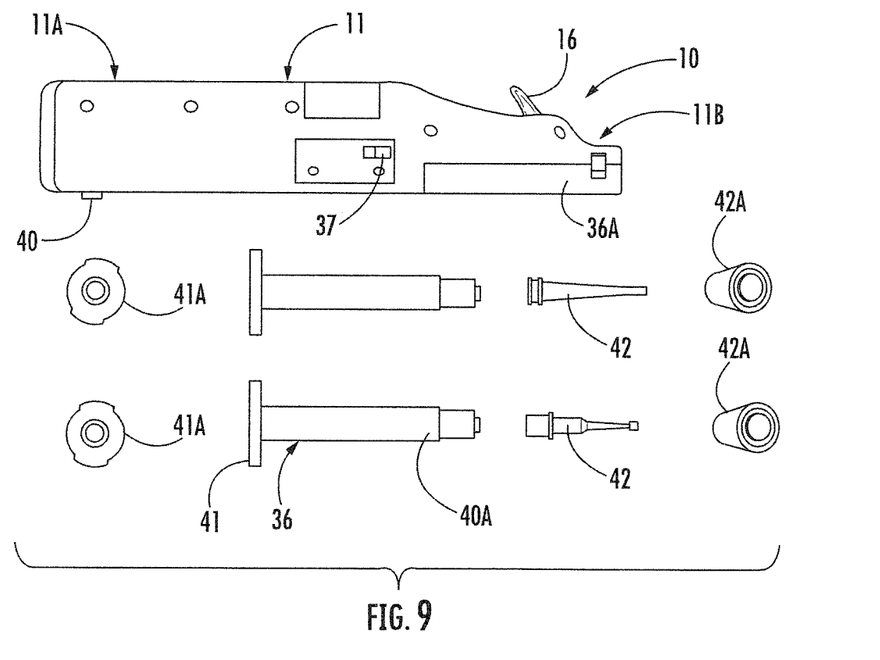
FIG. 9 is a composite side elevational view of the applicator and product cartridge for use therein.

It will be noted that the product cartridges 36 used in this example, best seen in FIG. 9 of the drawings is of a cylindrical syringe configuration 40A with a product engagement plunger fitting 37A as noted there within. Positioning engagement tabs 41 extend from the proximal end with an end cap 41A, an oppositely disposed applicator tips 42 one of which is so configured as to be deformable translaterally by the user for repositioning to assist with difficult to reach treatment locations as needed as understood by those skilled in the art. Tip caps 42A are provide for removal engagement therewith providing a seal for the respective cartage as described.

It will thus be seen that a new and novel controlled incremental injection device for dental compounds has been illustrated and described and it will be apparent to those skilled in the art that various changes and modifications may be made therein without departing from the spirit of the invention. Therefore, I claim:

The invention claimed is:

1. An application device for injecting viscous materials in metered amounts comprising,
    a housing having a handle portion and an access dispensing portion,
    a rotatable rod engagement cylinder in said housing,
    a threaded drive rod keyed within the rotatable rod engagement cylinder for engagement with a removable product cartridge in said housing,
    a control activation linkage for causing index rotation of the rod engagement cylinder,
    indexing drive gears engageable between said control activation linkage and said rod engagement cylinder,
    a threaded drive rod engagement gate movable from a first threaded drive rod engagement advancement position to a second threaded drive rod release position, a drive rod reset fitting and indicator movable linearly within said handle portion.

2. The application device set forth in claim 1 wherein said rotatable rod engagement cylinder comprises,
    an apertured central helical drive gear,
    oppositely disposed rod engagement keyed fittings extending from said helical drive gear registerably positioned within aligned bearing fittings in said housing.

3. The application device set forth in claim 1 wherein said control activation linkage comprises,
    a trigger adapted to engage a spring urged contact lever arm pivotally secured to a linkage arm at its proximal end,
    an indexing linkage extending from said linkage arms distal end,
    a indexing engagement pawl on said indexing linkage for indexing registration with one said indexing drive gears.

4. The application device set forth in claim 3 wherein said spring urged contact lever arm further comprises,
    an apertured bifurcated end.

5. The application device set forth in claim 1 wherein said indexing drive gears engageable between said control activation linkage and said drive rod engagement cylinder comprises,
    a helical drive pinion gear engageable on said rod engagement cylinder and an indexing engagement gear extending therefrom for indexing registration with said control activation linkage.

6. The application device set forth in claim 5 wherein said indexing engagement gear has a ratcheted pawl for engagement thereon for rotational directional restriction.

7. The application device set forth in claim 1 wherein said threaded drive rod comprises,
    a threaded rod having oppositely disposed longitudinally extending key engagement side surfaces.

8. The application device set forth in claim 1 wherein said removable product cartridge comprises,
    a cylindrical syringe having a product engagement piston within and a repositionable deformable applicator tip.

9. The application device set fort in claim 8 wherein said removable product cartage further comprise,
    end and tip caps for sealing said cartage before and after partial use as required.

10. The application device set forth in claim 1 wherein said housing is formed of molded synthetic resin material.

* * * * *